Dec. 5, 1961     C. W. WASHBURN ET AL     3,011,255

METHOD FOR JOINING CLAD RODS AND WIRES OR THE LIKE

Filed May 6, 1958

INVENTORS
Charles W. Washburn and
John A. Heidish

By Hoopes, Leonard & Buell
their Attorneys () # United States Patent Office 3,011,255
Patented Dec. 5, 1961

3,011,255
METHOD FOR JOINING CLAD RODS AND WIRES OR THE LIKE
Charles W. Washburn, Elizabeth Township, Allegheny County, and John A. Heidish, Pleasant Hills Borough, Pa., assignors to Copperweld Steel Company, Pittsburgh, Pa., a corporation of Pennsylvania
Filed May 6, 1958, Ser. No. 733,438
6 Claims. (Cl. 29—471.7)

This invention relates to a new system for joining the ends of bimetallic bars, rods and wires with retention at the joint of the valuable properties of the original clad material. More particularly, this invention relates to a relatively high strength and corrosion-resistant joint making system for clad materials (e.g., copper clad steel rod and wire) which, in addition, will not hinder drawing or other desired treatment of such clad materials.

"Copperweld" rod and wire are bimetallic materials having a steel core and a copper cladding. Such material is used in electrical and mechanical services and also in the manufacture of mechanical goods of many kinds. Frequently, such clad material is stored in the form of coils and reduced in cross section by drawing either by the manufacturer or by a user not wishing to keep a wide variety of sizes in stock. Moreover, for many uses, both electrical and mechanical, it is advantageous to have such bimetallic material in lengths longer than the standard length obtainable from a particular mill.

One preferred commercial practice for the joining of two lengths to form a longer bimetallic bar, rod or wire of the same size has included the making of a complementary scarf cut on the respective adjoining ends of two lengths to be fastened together. A thin fluxed sheet of silver was placed in contact with the two scarfed end faces and the joint was then heated by a gas torch in a reducing atmosphere until the joint was braze-soldered together. Thereafter, the joined clad material might be drawn into wire or otherwise treated as desired. Such practice involved a number of difficulties. It is a considerable problem to scarf cut such adjoining ends to match the contact surfaces and the alignment of those surfaces to place the respective cores and cladding in axial registry is a further difficulty. The presence of the silver sheet added to the problem and the strength of such joint when made was lower than the strength of the steel core due to the interposition of such silver between the core ends. Further, the joint area was relatively less corrosion resistant than the original material particularly when the joined material was drawn lengthening the scarfed joint.

In the present invention, the ends of the strength material in the core of the bimetallic member are directly welded together without any weakening caused by the interposition of any weaker solder or brazing material, or by the presence of cladding metal therein. As a result, a core joint made under this invention has substantially the strength of the original core material. The cladding is removed from the joint area to size the joined core material and the cladding is then extraneously restored utilizing a sleeve of cladding material and an alloy strip of a material such as silver brazing metal to bond the cladding sleeve to the core and adjoining edges of the original cladding after that sleeve and alloy have been pressed into the hollow around the welded core joint. Thereupon, the prepared joint is heated fusing the alloy to bond the remaining materials to the joint and provide a continuous bimetallic member of any length desired. The finished joint in nature, appearance and properties is virtually the same as the original clad material and the lengths so joined may be drawn into wire or heat treated or otherwise handled substantially as though the new joints were an integral part of the original bimetallic material.

Other objects, advantages and features of this invention will be apparent from the following description and the accompanying drawings, which are illustrative only, of one embodiment in which—

Figure 9:
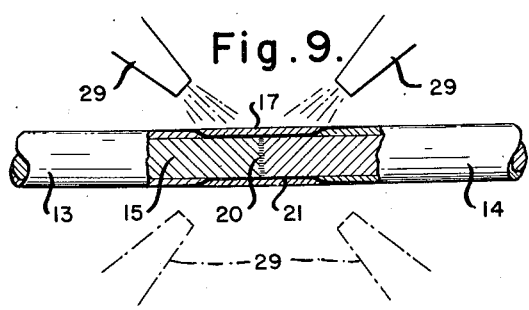
Figure 10:
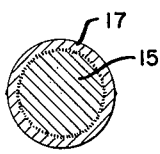

FIGURE 9 is a view, partly in section, longitudinally through the joint area showing the cladding replacement and bonding alloy elements in final position undergoing heating for completion of bonding at the joint; and FIGURE 10 is a cross section through the joint following the step illustrated in FIGURE 9 with the replacement cladding fully bonded to the welded core ends and to the adjoining ends of the cladding of the original material.

Figure 1:
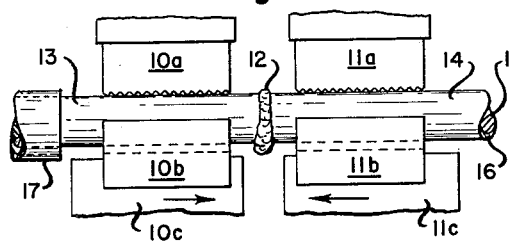
FIGURE 1 is a view illustrating resistance butt welding of two adjoining ends of two lengths of clad metal rod or wire to be joined in one practice of this invention.

In the embodiments of this invention illustrated in the drawings, the ends of two bimetallic elongated shapes (e.g., rods, wires, bars) such as rods of copper clad steel, or of other metals, are being joined. Such respective original bimetallic rods 13 and 14 may already have sheared square ends prior to joinder, or those ends may be cut across preparatory to the illustrated operation. Before the ends of the respective rods 13 and 14 are brought together for joinder in the illustrated embodiment, a cladding replacement sleeve element 17, if in the form of a seamless ring, is slipped over one of the rods as shown in FIGURE 1. Such ends may then be placed respectively in contact in the upper and lower clamp sets 10a and 10b and 11a and 11b of a welding machine which, as shown, is one of the electric resistance butt welding type. Other welding methods may be employed. As the stands 10c and 11c of the welding machine are moved toward one another, the rod ends are upset forming a flash burr 12. Each such rod has a core 15 of a prescribed diameter which may be made of a strength metal such as steel and a clad cover 16 surrounding the core 15 and preferably metallurgically bonded thereto. The cladding 16 of each of the rods 13 and 14 may, as in the case of copper or aluminum, be used in electrical services to conduct electricity and protect the core metal against corrosion. In the case of mechanical services or mechanical goods made from such bimetallic members, the cladding may serve principally to protect the core against corrosion.

Figure 2:
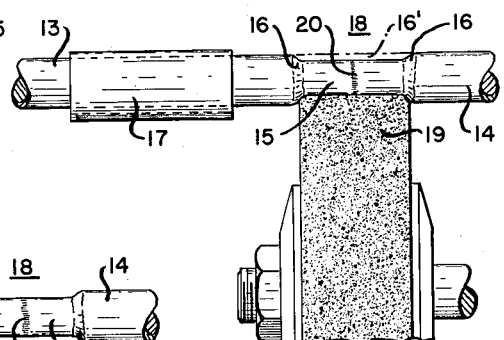
FIGURE 2 is a view illustrating the removal of the original cladding from the joint area to remove flash and restore the butt welded core material substantially to its original diameter, a sleeve of extraneous cladding material being in readiness position adjacent the joint area.
Figure 3:
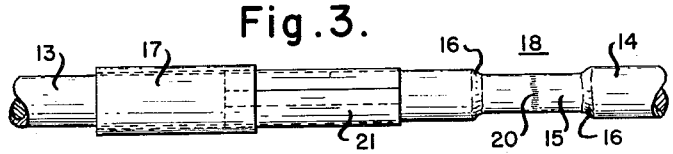
FIGURE 3 is a view illustrating one way of placing a sleeve of bonding material inside the cladding replacement sleeve.

The welding pressure produced by welding machine 10—11 will cause the core material to weld and mushroom radially beyond the area of contact so that about the axis of the rods the area of the core material at the welding joint is greater than its original diameter and uncontaminated by the cladding which is pushed away from the axis of the rod in the immediate area of the weld. The joint, designated 18, of the welded rods 13 and 14 is then ground as by a suitable abrasive wheel 19 until the core material 15 around the weld area 20 is restored to its original diameter. Inasmuch as the weld 20 is a direct core strength metal to strength metal weld, the strength of the joint 18 will be high compared with the original strength. In the course of such grinding, the burr 12 and cladding metal 16 is preferably removed to each side of the weld surface 20, leaving a cladding depression 16′ shown in FIGURE 2 extending from the surface of the exposed core metal to the original outside diameter of the rods being joined.

A releatively high temperature solder strip 21, such as a hard silver alloy solder material, is wrapped around the rod to one side of the joint area 18 so that it may be slipped inside of ring 17. Before being so applied, the strip 21 is preferably covered with a suitable solder flux, of which a number are known. If desired, the exposed core metal 15 in joint area 18 may also be coated with flux. The alloy strip element 21 is very thin and preferably is somewhat longer than the length of the cladding replacement metal 17. The replacement and solder elements 17 and 21 then are slid into the concentric position illustrated in FIGURE 4 around the outside of the cladding depression 16′. An additional solder flux coating may be applied around the edges of the concentric sleeves 17 and 21 when they are in the position shown in FIGURE 4. The thickness of the cladding replacement element 17 is selected at about the radial thickness of the cladding depression 16′ so as to fill the depression up evenly upon compression. The material of which the cladding replacement is made is preferably substantially the same as the original cladding material, or fully compatible therewith, for the intended subsequent treatment, if any, and use to which the final product is to be applied.

Figure 4:
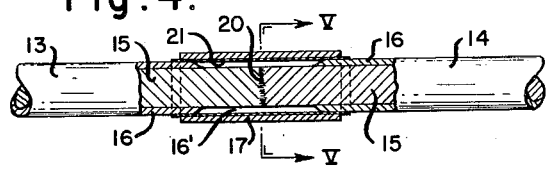
FIGURE 4 is a view, partly in section, with the cladding replacement and braze or solder alloy elements shown in FIGURE 3 in position surrounding the cladding depression at the joint area.
Figure 5:
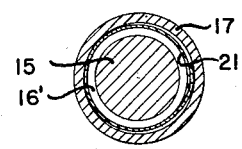
FIGURE 5 is a view taken along line V—V of FIGURE 4.
Figure 6:
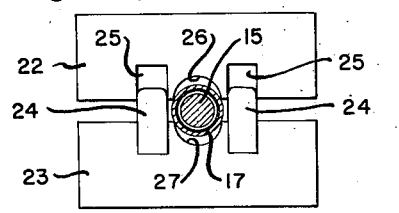
FIGURE 6 is a view showing the joint assembly in readiness to be pressed to fill in the cladding area depression.
Figure 8:
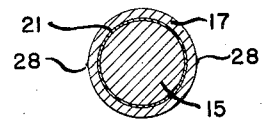
FIGURE 8 is a cross-sectional view of the pressed joint removed from the press shown in FIGURE 7.
Figure 7:
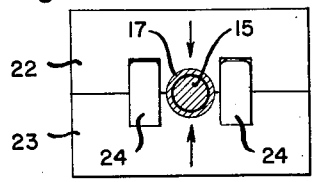
FIGURE 7 is a view like that shown in FIGURE 6 after the press has been closed.

With the materials assembled as shown in FIGURES 4 and 5, the joint 18 is placed in a press between upper die 22 and lower die 23. The lower die may be fitted with guides 24 to enter complementary recesses 25 in die 22 as the two dies are brought together. The upper die is provided with a longitudinally extending invert semicircular upper die recess 26 and the lower die 23 with a longitudinally extending semicircular lower die recess 27. The radius of the die recesses is just about the same as the radius from the center axis to the outside of the original clad rods 13 and 14. There is no heating of the joint materials or dies and no axial restraint along the die recesses and as the dies are brought together by a press (not shown) into the position shown in FIGURE 7, depression 16′ will be filled such that the joint in area 18 will have the same outside diameter as that of the original clad material, as shown in FIGURE 8. Slight protuberances 28 may be along the sides of the joint area following such die-pressing and mark the parting edge on each side between the upper and lower die meeting edges. Such protuberances 28 normally offer no impediment to reduction drawing and will disappear in the course of any such drawing. Such protuberances may, on the other hand, be ground or milled off or otherwise removed, if desired, before drawing or any other treatment that may be scheduled. The compression of the cladding replacement metal and solder strip element causes the axial ends thereof to press into firm contact with the ends 16 of the original cladding material and to feather around the same as illustrated in the longitudinal section shown in FIGURE 9 so that the original diameter is restored without interruption.

Completion of the bonding of the cladding replacement material 17 in the joint area 18 to the core metal and the respective ends of the original cladding 16 is then obtained by heating the joint to a temperature approximating the melting point of the solder element 21 causing it to fuse and bond over the entire interface with the core, original cladding edges and compressed replacement cladding 17. Such heating may be performed in a number of ways, the one shown being provided by a twin torch 29 which preferably is of a type which provides its own fluxing atmosphere at the joint as it is being heated to bonding temperature. The torch may be operated by hand, or by a machine, and should be played around the joint so that the entire joint is relatively uniformly heated until such bonding occurs.

By way of example only and not by way of any limitation, it may be desired to join two Copperweld copper-clad steel wires of 0.229 of an inch outside diameter having a so-called 40% conductivity which corresponds to a copper cladding radial thickness of about 0.029 of an inch. In that case, a cladding replacement sleeve would be used made of copper preferably of a very low oxygen content to assist in obtaining optimum bonding. The outside diameter of the sleeve might be 0.263 of an inch with a wall thickness of 0.016 of an inch while the solder strip might have a thickness of 0.003 of an inch. Generally, the length of the prepared cladding depression after core welding will be about 1 inch long. A variety of silver or other solder alloys such as is shown listed in A.S.T.M. Standards specification B260–52T would be appropriate such as B-Ag 8, B-Ag 11, B-Cu-Au 1 and others.

The bonded joint so produced has substantially the strength, electrical conductivity and corrosion resistance of the original bimetallic material. The new joint of this invention also will enable the rods 13 and 14 so joined to be heat treated or drawn into wire or other shape or otherwise handled as though the joint were original clad material. The cladding of the joint so produced will not blister, check, or loosen and will meet the various tests of industry and use met by such original material. Further, the new system is readily applicable to a wide variety of sizes and shapes of bimetallic members and to various other compositions. The new system does not require special machinery or craft skills and does eliminate deficiencies present in practices used heretofore.

Although the copper replacement sleeve 17 has been illustrated in the form of a seamless ring, it may be made in the form of a ring with a longitudinal seam or may be formed in place by wrapping a strip of replacement metal around to form a sleeve of the requisite diameter. Conversely, the braze-solder alloy element may be made in ring form rather than in the wrapped strip form shown in the above illustrated embodiment. If in ring form, the alloy sleeve should be slipped over one rod end before the respective cores of two rods are welded to bond them together. Still further, a composite sleeve may be provided in which the replacement metal is coated on the inner surface thereof with the alloy element to be fused in the bonding completion step. Again, while the illustrated embodiment deals with end-to-end joinder of solid bimetallic shapes, the method hereof may also be applied in some cases to bimetallic tubes, or to clad flat shapes of base and cladding metal composition. Generally speaking, while the invention is more advantageous in connection with the end-to-end joinder of clad metal members, it may also be applied to the joinder of metal members having coatings thereon.

Various other modifications may be made in portions of the illustrated embodiment, or in the order or number of the steps thereof, and, further, other embodiments may be devised, without departing from the spirit of our invention or the scope of the appended claims.

We claim:

1. In a method for joining the ends of copper clad steel core rods and wires or the like, the steps comprising, in combination, sliding a seamless sleeve of copper cladding replacement metal over one of said ends, axially aligning adjoining ends of a pair of said rods and wires or the like, contact resistance welding said adjoining ends with said cladding thereon and upsetting them in the course of such welding, abrasion removing the flash around said weld generally parallel to and uniformly around the axis of said welded ends to reduce the steel core at said weld substantially to its original diameter forming a depression in the cladding area across said weld, providing a thin strip of silver solder bonding alloy or the like wrapped in the form of a hollow cylinder adjacent said sleeve and the cladding depression, relatively sliding said sleeve and cylinder into concentric position covering said cladding depression, said cylinder approximating the length of said sleeve, said sleeve and cylinder being slightly longer than the length of said cladding depression, fluxing said area, die compressing said sleeve and cylinder without longitudinal restriction to force the same into said cladding depression in contact with said core and the original cladding metal ends adjoining said area until the outside diameter in said area is substantially equal to the outside diameter of said original clad rods and wires or the like, heating said compressed cladding replacement metal sleeve and cylinder in a non-oxidizing atmosphere until the material of said cylinder sweats and bonds said compressed cladding replacement metal to said core and adjoining original cladding metal.

2. In a method for joining clad rods and wires or the like having a core of one metal and a surrounding cladding of another metal metallurgically united thereto, the steps comprising, in combination, axially aligning adjoining ends of a pair of said rods and wires or the like, upset resistance welding said adjoining ends with said cladding thereon, removing the welding burr and cladding from the vicinity of said weld to restore the core in the weld area substantially to its original diameter, positioning a thin hollow cylinder of high temperature high strength soldering alloy around the cladding depression formed by said removal, positioning a sleeve of cladding replacement metal around said cylinder, said cylinder having a somewhat greater length than the length of said sleeve, said sleeve and cylinder being slightly longer than the length of said cladding depression, compressing said sleeve and cylinder to force the same into said cladding depression in contact with said core and the original cladding metal adjoining said area until the outside diameter in said area is substantially equal to the outside diameter of said original clad rods and wires or the like, heating said compressed cladding replacement metal sleeve and cylinder in a non-oxidizing atmosphere until the material of said cylinder fuses and bonds said compressed cladding replacement metal to said core and original cladding metal in said weld area.

3. In a method for end-to-end joining metallic rods and wires or the like having a core and a surrounding cladding bonded thereto, the steps comprising, in combination, axially aligning and pressure welding adjoining core and cladding ends of a pair of said rods and wires or the like, removing the resulting flash around said welded joint substantially down to the original diameter of said welded core ends to provide a depressed spaced across and around said joint, positioning an inner thin layer of high temperature brazing alloy around the space where such flash was removed, positioning a solid layer of cladding replacement metal around said thin layer, said layers being substantially as long as said space, compressing said layers to fill said space until the outside thereof is substantially flush with the surface of the original cladding at each end of said space, and heating said compressed layers until said thin layer bonds said compressed thick layer to said core and the adjoining unremoved original cladding.

4. A method as set forth in claim 3 in which said compressing is die compressing, said heating is gas torch heating in a non-oxidizing atmosphere and protuberances resulting from said die compressing are removed to ready said joined metallic rods and wires or the like for drawing or other deformation including deformation of said joint.

5. In a method for joining clad shapes of metal having a base and a cladding metallurgically bonded thereto, the steps comprising, in combination, relatively moving the bases of a pair of said clad shapes into registered engagement with one another, metallurgically bonding said bases in the area of said engagement with the cladding thereon by butt welding, removing said cladding of said pair of clad shapes to each side of said area of engagement, superposing a replacement cladding member is juxtaposition to the depression formed by said removal step, said replacement member having an area substantially equal to the area of said cladding depression and a thickness approximating the thickness of the original cladding, interposing a relatively thin braze-solder alloy member between said replacement member and said cladding depression, cold pressing said replacement member and braze-solder member into said cladding depression with sufficient force to provide a substantially flush replacement cladding surface across said area of engagement, and fusing said braze-solder member to complete the bonding of said compressed replacement member to the adjoining base and original cladding metal surfaces.

6. In a method of joining adjoining ends of clad core rods, wires and the like of metal, the steps comprising, in combination, upset butt welding said ends in end-to-end alignment, removing upset material to a depth below the original surface of said clad core rods, wires and the like substantially down to the original core cross section at said weld, covering the space provided by said removal of said material with a layer of cladding replacement metal, forcing said replacement metal into said space to fill it with the cross section of said filled space substantially equal to the original cross section of said clad core rods, wires and the like and continuous with original metal bordering said space, and heat bonding said replacement metal to said adjoining original metal, whereby clad core rods, wires and the like so joined may be reduced in cross section as by continuous die drawing.

References Cited in the file of this patent

UNITED STATES PATENTS

| | | |
|---|---|---|
| 441,884 | Meyer | Dec. 2, 1890 |
| 449,428 | Peck | Mar. 31, 1891 |
| 2,062,886 | Jensen | Dec. 1, 1936 |
| 2,231,014 | Lytle et al. | Feb. 11, 1941 |
| 2,300,850 | Wolcott | Nov. 3, 1942 |
| 2,556,160 | Ayers | June 12, 1951 |

UNITED STATES PATENT OFFICE

CERTIFICATE OF CORRECTION

Patent No. 3,011,255 December 5, 1961

Charles W. Washburn et al.

It is hereby certified that error appears in the above numbered patent requiring correction and that the said Letters Patent should read as corrected below.

Column 2, line 37, for "embodiments" read -- embodiment --; column 3, line 14, for "releatively" read -- relatively --; line 28, for "sleeeves" read -- sleeves --; column 5, line 58, for "spaced" read -- space --; column 6, line 22, for "is" read -- in --.

Signed and sealed this 17th day of April 1962.

(SEAL)
Attest:

ESTON G. JOHNSON

Attesting Officer

DAVID L. LADD

Commissioner of Patents